United States Patent [19]

Wolcott

[11] Patent Number: 4,476,410

[45] Date of Patent: Oct. 9, 1984

[54] EDDY CURRENT COUPLING WITH SLIP RING CLEANING MECHANISM

[76] Inventor: John H. Wolcott, 7912 160th Ave., Bristol, Wis. 53104

[21] Appl. No.: 522,447

[22] Filed: Aug. 12, 1983

[51] Int. Cl.³ ............................................. H02K 13/00
[52] U.S. Cl. .................................... 310/228; 310/105; 310/232
[58] Field of Search ............... 310/228, 227, 103, 105, 310/232

[56] References Cited

U.S. PATENT DOCUMENTS

| | | | |
|---|---|---|---|
| 2,979,685 | 4/1961 | Filipczak | 310/228 X |
| 3,673,447 | 6/1972 | Zumbach et al. | 310/227 |
| 4,020,645 | 5/1977 | Pittagore | 310/228 X |
| 4,188,713 | 2/1980 | Kawano | 310/235 X |

Primary Examiner—Donovan F. Duggan

[57] ABSTRACT

An eddy current coupling (11) includes a housing (13, 15, 17), a rotor (29), an inductor drum means (25), coil means (41) for electro-magnetically coupling the rotor member and the inductor drum means and a slip ring assembly (45) for energizing the coil. The slip ring assembly includes a first support member (55) connected to the rotor member for rotation therewith, slip ring means (47, 49) for energizing the coil means supported by the first support member, a second support member (56) and brush means (51, 53) supported by the second support member. The first and second support members define a sealed chamber (80) in which the slip ring means and brush means are located. A passageway means (92) is provided from the sealed chamber for directing wear debris generated by the contact between the brush means and slip ring means from the sealed chamber. An impeller (98) is provided for impelling the debris through the passageway means and from the chamber.

20 Claims, 4 Drawing Figures

EDDY CURRENT COUPLING WITH SLIP RING CLEANING MECHANISM

BACKGROUND OF THE DISCLOSURE

1. Field of the Invention

The present invention relates to an eddy current coupling or a dynamoelectric machine, and more particularly to a new and improved slip ring assembly for such a device. Eddy current couplings and dynamoelectric machines of the type disclosed herein are well known in the art. Generally, a slip ring assembly is utilized to provide electrical energy to a rotating field coil. The electrical energy is generally supplied through a slip ring assembly which includes a pair of slip rings and a pair of brushes for energizing the coil. It is often desirable to enclose the slip rings and brushes to exclude hostile environments in order to prevent chemical or electrolytic corrosion. However, when the slip rings and brushes are enclosed, the chamber in which the slip rings and brushes are located tends to accumulate material worn off the brushes. This wear material is electrically conductive and when allowed to accumulate, will cause a short circuit and ultimate failure of the equipment. The present invention describes a new and improved slip ring assembly which overcomes problems associated with the prior art by providing a sealed slip ring assembly chamber and an impeller for directing particulate debris from the sealed chamber through a passageway means.

2. Prior Art

The Kawano et al U.S. Pat. No. 4,188,713 discloses a method of making a commutator for a small-sized electric motor. Kawano discloses gaps for cleaning out particulate debris by centrifugal force from between the commutator spaces but not from an atmospherically enclosed chamber.

SUMMARY OF THE INVENTION

The present invention relates to a new and improved dynamoelectric machine which includes a sealed slip ring chamber, passageway means for directing debris from the sealed chamber and an impeller for impelling the debris from the sealed chamber to the passageway means.

The present invention relates to a new and improved eddy current coupling which includes a housing, a rotor member, an inductor drum means rotatable about an axis of rotation relative to the rotor member, coil means and a slip ring assembly for supplying energy to the coil means. The slip ring assembly includes a first support member connected to the rotor member for rotation therewith, slip ring means for energizing the coil means supported by the first support member, a second support member supported by the housing, brush means supported by the second support member in a position in which the brush means conductively engage with the slip ring means. The first and second support members define a sealed chamber in which the slip ring means and brush means are located. Passageway means is provided from the sealed chamber from directing wear debris from the sealed chamber and impeller means are provided for impelling the debris from the chamber to the passageway means.

A further provision of the present invention is to provide a new and improved eddy current coupling as set forth in the preceding paragrph wherein the impeller means includes a plurality of fan blades integrally formed with the first support member and wherein the fan blades pass at least in part into said passageway means to impel debris therethrough.

Still another provision of the present invention is to provide a new and improved dynamoelectric machine including a housing, a first mechanism located in the housing, a second mechanism located in the housing and rotatable relative to the first mechanism, rotating coil means located in the housing for electromagnetically coupling the first and second mechanisms and a slip ring assembly for supplying energy to the coil means. The slip ring assembly includes a first support member connected to the second mechanism for rotation therewith, slip ring means for energizing the coil means supported by the first support member, and a second support member supported by the housing, brush means supported by the second support member in a position in which the brush means conductively engage with the slip ring means. The first and second support members define a sealed chamber in which the slip ring means and brush means are located. A passageway means is provided from the sealed chamber for directing wear debris generated by the contact between the brush means and slip ring means from the sealed chamber and an impeller means is provided for impelling the debris from the chamber through the passageway means.

DESCRIPTION OF THE PREFERRED EMBODIMENT

Figure 1:
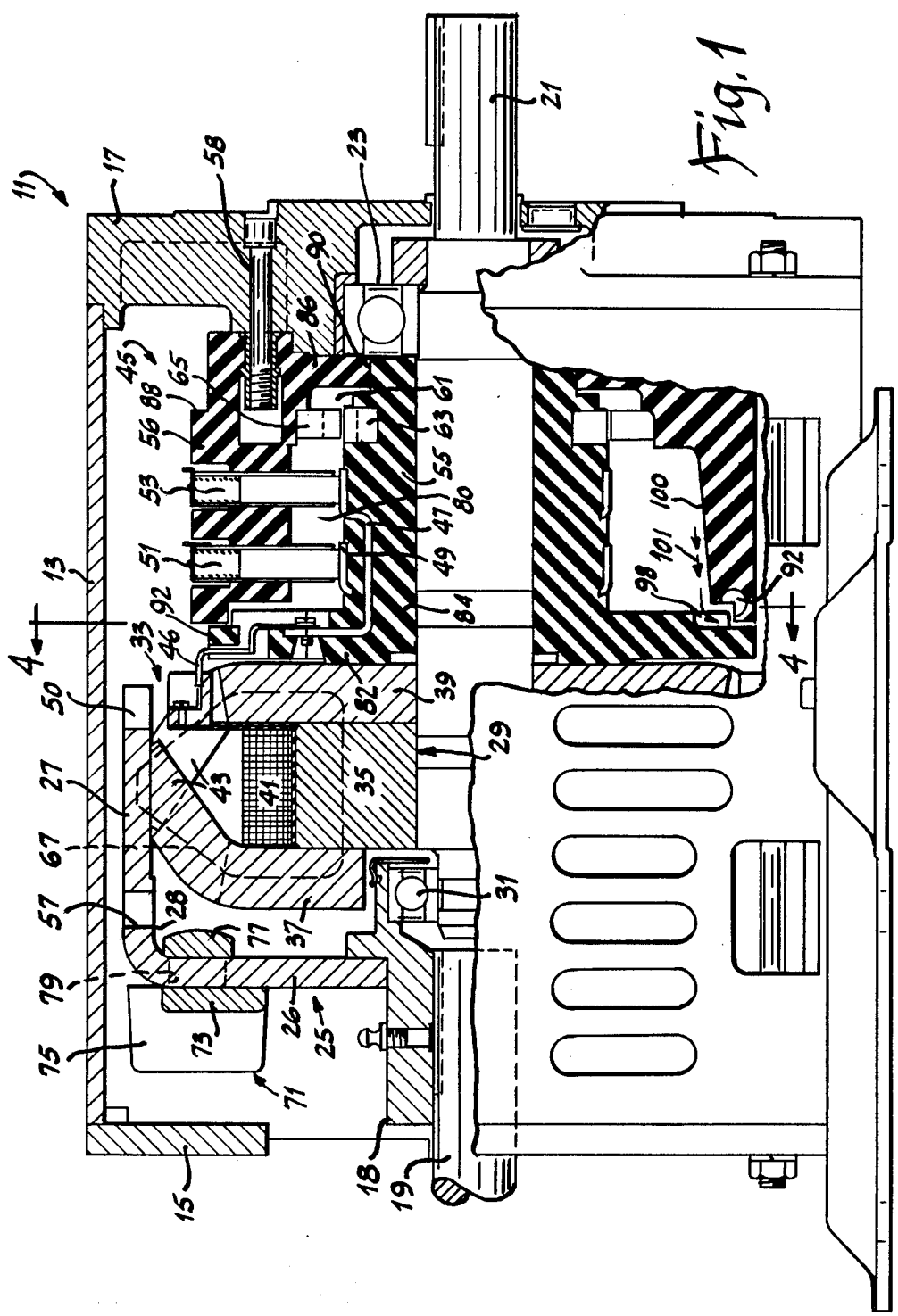
FIG. 1 is a partial sectional view of a typical dynamoelectric coupling to which the present invention has been adapted.
Figure 2:
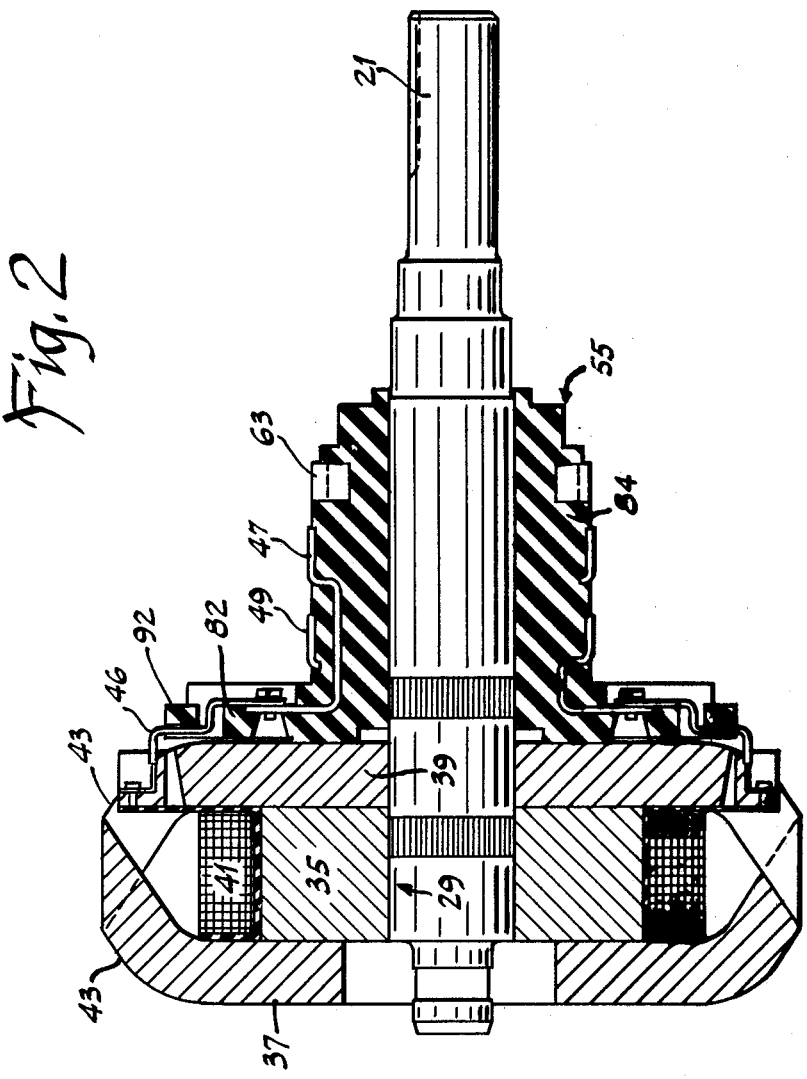
FIG. 2 is a cross-sectional illustration of the rotor and shaft assembly.

FIG. 1 is a longitudinal partial section of a typical eddy-current coupling device to which the present invention may be adapted. The coupling device, generally designated 11, includes a central housing 13 and end members 15 and 17. The end member 15 includes a central opening therein for receiving a driven shaft 19 and the end member 17 supports a driven shaft 21, which in part is supported by a bearing 23 supported in the end member 17.

The drive shaft 19 may be driven in a well known manner by a prime mover such as a motor, not illustrated. Keyed to the drive shaft 19 is an inductor assembly or inductor drum means 25 including a hub portion 18, a radially extending portion 26 and a cylindrical inductor drum portion 27 which will be described in greater detail subsequently, but which is composed of a ferro magnetic material such as steel and which may have a substantially uniform magnetic reluctance.

Keyed to the driven shaft 21 for rotation therewith is a magnetic field pole assembly or rotor assembly 29. A pilot bearing 31 is supported on the end of the driven shaft 21 and is supported by the drive shaft 19 for rotation relative to the inductor drum assembly 25 and the pole assembly 29. The pilot bearing 31 locates the inductor drum assembly 25 in the central portion of the housing 13 relative to the pole assembly 29 which is supported on the driven shaft 21 for rotation therewith. The pilot bearing 31 maintains a radial air gap or clearance between the inductor assembly 25 and the pole assembly 29 to provide for relative rotation therebetween.

The field pole assembly 29 includes a magnetic pole assembly 33, comprising a magnetic ring 35 supported on the shaft 21 and a pair of pole members 37, 3C9. A field coil 41 is supported on the magnetic ring 35 to energize the magnetic pole assembly 33. The pole members 37 and 39 carry pole teeth or poles 43 thereon which are interdigitated. The pole teeth 43 are disposed adjacent an innersurface 28 of the cylindrical portion 27 of the inductor drum assembly 25. A narrow air gap or space is provided between the poles 43 and the innersurface 28 of the inductor drum portion 27 to provide for relative rotation between the inductor drum assembly 25 and the pole assembly 29. As indicated herein above, the pilot bearing 31 locates the inductor drum assembly 25 relative to the pole assembly 29 and to maintain the radial air gap therebetween which allows the inductor drum assembly and the pole assembly 29 to rotate relative to each other.

Energization of the field coil 41 establishes a flux path, represented by the dotted lines 67 in FIG. 1, which eletromagnetically couples the field pole assembly 29 and the inductor drum assembly 25 so that rotation of the inductor drum assembly 25 by the driven input shaft 19 effects rotation of the pole assembly 29 and output shaft 21 connected thereto in a well-known manner. The magnitude of the energization of field coil 41 controls the slip between the pole assembly 29 and the inductor drum assembly 25 in a well-known manner.

During the operation of the electromagnetic coupling device 11, relative rotation between the pole assembly 29 and inductor drum assembly 25 results in the generation of eddy currents in the cylindrical portion 27 of the inductor drum. These eddy currents produce a magnetic field which permits the transmission of torque from the inductor drum assembly 25 to the pole assembly 29 as discussed above. Normally, a certain amount of "slip" occurs during the rotation of the inductor drum assembly 25 and the pole assembly 29 and such "slip", or difference in rotational speed between the pole assembly 29 and inductor drum assembly 25, generates heat in the inductor drum assembly 25. The cylindrical portion 27 of the inductor drum assembly 25 includes a plurality of axially extending teeth 50 disposed on the end portion thereof. These teeth 50 and the notches in between act to dissipate heat generated in the cylindrical portion 27 of the inductor drum assembly 25. The inductor drum assembly 25 further includes a plurality of radially extending openings 57 arranged in an annular array about the cylindrical portion 27 of the inductor drum assembly 25. The openings 57 are adapted to have a cooling medium such as air flow therethrough to dissipate heat generated in the inductor drum assembly 25.

The inductor drum assembly 25 includes a heat dissipating member 71 disposed on the radially extending portion 26 thereof. The heat dissipating member 71 comprises an annular ring portion 73 having a heat dissipating surface thereon which includes a plurality of fins 75 extending therefrom in a direction substantially parallel to the axis of rotation of the drum assembly 25 and a plurality of fastening means or rivets 77 which also extend parallel to the axis of rotation but in a direction opposite to that in which the fins 75 extend. The heat dissipating member 71 is operable to rotate with the inductor drum assembly 29 and dissipate heat generated in the inductor drum assembly 29 by the eddy current action. The rivet means or rivet members 77 are integrally formed with the heat dissipating member 71 and each rivet 77 is operable to be received in one of a plurality of openings 79 disposed in the radially extending portion 26 of the inductor drum assembly 25. After the rivets 77 are located in the openings 79 the heads of the rivets are deformed to secure the heat dissipating member 71 to the inductor drum assembly 25. By insuring that the rivets 77 are under compression in both an axial and radial direction when the heat dissipating member 71 is attached to the inductor drum assembly 25 greater and more efficient thermal-contact occurs between the rivets of the heat dissipating member 71 and the inductor drum assembly 25. This provides for better heat dissipation from the inductor drum assembly 25 through the rivets 77 and to the fins 75 of the heat dissipating member 71. The fins 75 then dissipate heat to a cooling medium such as air when the inductor drum assembly 25 rotates.

The field coil 41 is energized via a pair of leads 46. The leads 46 extend from a slip ring assembly 45. The slip ring assembly 45 includes a pair of slip rings 47 and 49, a slip ring support 55, a pair of brush assemblies 51, 53 and a brush holder or support 56. (The slip ring support 55 and the brush holder 56 cooperate to define a sealed chamber 80 in which the brush assemblies 51, 53 and slip rings 47 and 49 are disposed.) The leads 46 are connected to the slip rings 47 and 49 which are supported on the slip ring support 55 which is supported on the output shaft 21 for rotation therewith. The brush holder 56 is supported on one end cap 17 by a plurality of bolt and nut assemblies 58, only one of which is illustrated. The brush assemblies 51 and 53 extend from the brush support 56 in a radial direction and contact the slip rings 49 and 47, respectively. The brush assemblies 51 and 53 are energized via leads, not illustrated, in a well known manner. The brush assemblies 51 and 53 operate to transfer electrical energy to the field coil 41 via the leads 46 and slip rings 47 and 49.

A tachometer generator assembly 61 may be located in the sealed chamber 80. The tachometer generator 61 is operable to establish a signal on an output line thereof, not illustrated, which is indicative of the speed of the output shaft 21 and which signal may be utilized by electrical circuitry, not illustrated, to control the speed of the output shaft 21, in a well-known manner. The tachometer generator 61 includes a plurality of permanent magnetic poles 63 which are supported for rotation on the slip ring support member 55 which rotates with output shaft 21. A stator assembly 65 is supported by the brush holder 56 adjacent the permanent magnetic poles 63 of the tachometer generator 61 and is operable to have a current induced therein, in a well-known manner, which is proportional to the speed of the output shaft 21.

The sealed chamber 80 which encloses the slip rings 47, 49 and the brushes 51, 53 protects the slip rings and brushes from hostile environments in order to prevent chemical and electrolytic corrosion and to exclude atmospheric contaminates that might otherwise cause premature failure of the slip rings and brushes. The slip ring support 55 includes a radially extending portion 82 and an axially extending portion 84. The brush holder 56 includes a radially extending portion 86 and an axially extending portion 88. A seal 90 is provided between the radially extending portion 86 of the brush holder 56 and the axially extending portion 84 of the slip ring support 55. A seal 92 is provided between the radially extending portion 82 of the slip ring support 55 and the axially extending portion 88 of the brush holder 56. The seals 90 and 92 seal chamber 80 to prevent hostile environments from effecting the slip ring assembly 45. The seals 90, 92 are illustrated as face seals but could be other types of seal members such as labyrinth seals.

Figure 4:
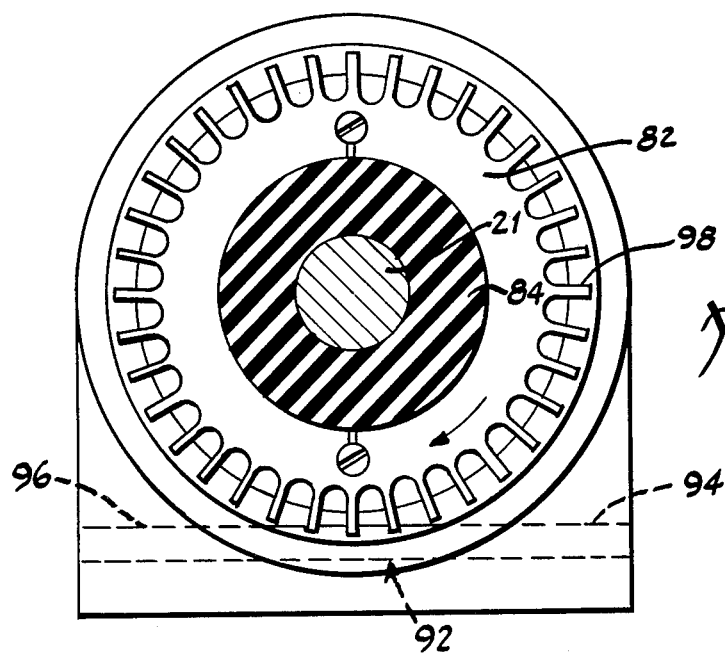
FIG. 4 is a cross-sectional view taken approximately along the lines 4—4 of FIG. 1 more fully illustrating the impeller means for impelling the debris from the chamber.

A passageway 92 is provided to direct particulate debris accumulated from material worn off the brushes 51, 53 from the chamber 80. To this end, the passageway 92 includes an inlet passageway 94, more fully illustrated in FIG. 4, for directing air into the sealed chamber 80 and an outlet passageway 96 for directing air and the particulate debris from the chamber 80. An impeller means is provided for impelling the particulate debris from the chamber 80 to the outlet passageway 96. The impeller means includes a plurality of fan blades 98 which are disposed on the radially extending portion 82 of the slip ring support 55 and which rotate therewith. The fan blades 98, more fully illustrated in FIG. 4, pass in part into the passageway 92 to impel particulate debris by centrifugal force from the chamber 80 through the outlet passageway 96.

Figure 3:
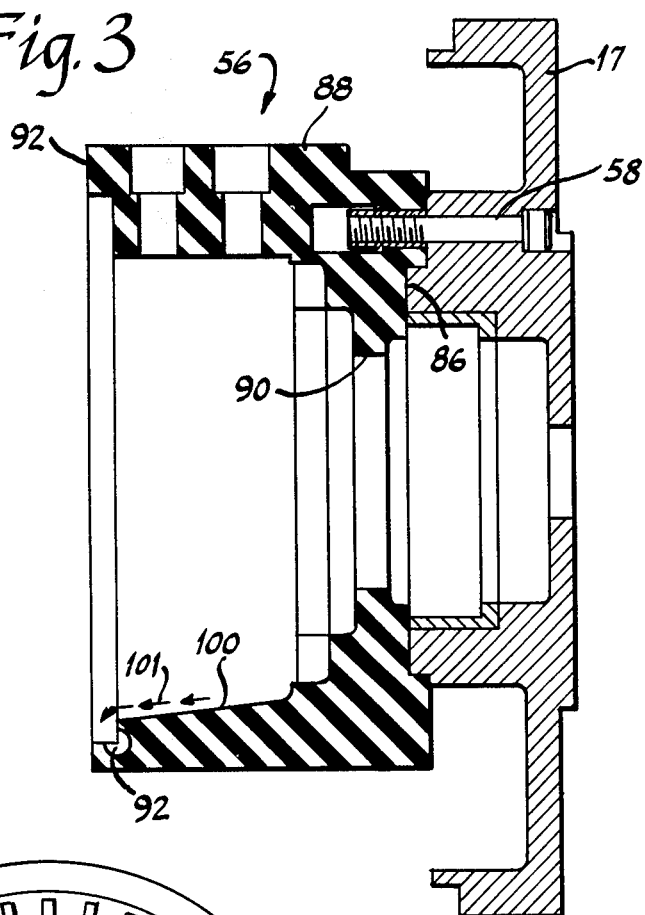
FIG. 3 is a cross-sectional view of the right hand end member as illustrated in FIG. 1 and more fully illustrating the second support member.

The chamber 80 includes an inner surface 100 on the outer periphery thereof which is sloped in a radially outwardly direction and which communicates with the outlet passageway 96 at one end thereof. The sloped surface 100 has particulate debris directed thereto by centrifugal and gravitational forces as shown by small arrows 101 in FIG. 3. The centrifugal and gravitational forces tend to push the particulate debris down the sloped surface 100 and into the fan blades 98 where it is then impelled tangentially through the discharge passageway 96 and from the sealed chamber 80. The inlet passageway 94 allows air to enter the passageway 92 where it is impelled along with the particulate debris outwardly thus through the discharge passageway 96 thereby preventing the creation of a vacuum in sealed chamber 80 which if created would tend to draw undesirable atmospheric contaminates into the sealed chamber. The air in inlet passageway 94 is impelled directly out of the discharge passageway 96 without entering the sealed chamber thereby preventing the flow of contaminates into the sealed chamber. Thus, it should be apparent that the slip ring assembly allows the apparatus to work in hostile environments and provides a passageway therefrom whereby wear material from the brushes is directed from the sealed chamber 80 to prevent the electrically conductive debris from causing a short circuit and failure of the coupling 11.

From the foregoing it should be apparent that a new and improved eddy current coupling has been provided which includes a housing, a rotor member located in the housing and rotatable about an axis of rotation, inductor drum means located in the housing and rotatable about an axis of rotation relative to the rotor member, coil means for electromagnetically coupling the rotor and inductor drum means and a slip ring assembly for supplying energy to the coil means. The slip ring assembly includes a first support member connected to the rotor member for rotation therewith, slip ring means for energizing the coil means supported by the first support member for rotation therewith, a second support member supported by the housing and brush means supported by the second support member to engage with the slip ring means. The first and second support members define a sealed chamber in which the slip ring means and brush means are located and a passageway means is provided from the sealed chamber for directing wear debris generated by the contact between the brush means and slip ring means. An impeller is provided for impelling the debris through the passageway means from the sealed chamber yet preventing atmospheric contaminates from entering the sealed chamber. While the present invention has been illustrated as being utilized with an eddy current coupling, it should be realized that the slip ring assembly could be utilized with other types of dynamoelectric machines.

What I claimed is:

1. An eddy current coupling comprising a housing, a rotor member disposed in said housing and rotatable about an axis of rotation, inductor drum means disposed in said housing and rotatable about an axis of rotation relative to said rotor member, coil means located in said housing for producing an electro-magnetic field for electromagnetically coupling said rotor member and said inductor drum means, and a slip ring assembly for supplying energy to said coil means, said slip ring assembly including a first support member connected to said rotor member for rotation therewith, slip ring means for energizing said coil means supported by said first support member for rotation therewith, a second support member supported by said housing, brush means supported by said second support member in a position in said housing in which said brush means conductively engage with said slip ring means, said first and second support members defining a sealed chamber in which said slip ring means and brush means are located, passageway means from said sealed chamber for directing wear debris generated by the contact between said brush means and slip ring means from said sealed chamber and impeller means for impelling the debris through said passageway means and from said chamber.

2. An eddy current coupling as defined in claim 1 wherein said impeller means includes a plurality of fan blades integrally formed with said first support member and rotatable therewith for impelling debris from said chamber into said passageway means.

3. An eddy current coupling as defined in claim 2 wherein said fan blades pass at least in part into said passageway means to impel debris therethrough.

4. An eddy current coupling as defined in claim 1 wherein said passageway means includes an inlet passageway communicating with said sealed chamber at one end thereof for directing air through said passageway means but not into said sealed chamber and an outlet passageway communicating with said sealed chamber at one end thereof for directing debris out of said sealed chamber.

5. An eddy current coupling as defined in claim 1 wherein said sealed chamber includes an inner surface on the outer periphery thereof which is sloped in a radially outward direction and which communicates with said passageway means, said inner surface accumulating debris thereon which are directed in a radially outwardly direction along said sloped inner surface to said passageway means.

6. An eddy current coupling as defined in claim 4 wherein said sealed chamber includes an inner surface on the outer periphery thereof which is sloped in a radially outward direction and which communicates with said outlet passageway, said inner surface accumulating debris thereon which are directed in a radially outwardly direction along said sloped inner surface to said outlet passageway.

7. An eddy current coupling as defined in claim 6 wherein said second support member is stationary and said first support member rotates relative to said second support member and further including seal means disposed between said first and second support members for sealing said sealed chamber defined by said first and second support members 8. An eddy current coupling as defined in claim 1 wherein said first support member includes an axially extending portion and a radially extending portion, said slip ring means being supported on said axially extending portion and having an axially extending surface for engaging with said brush means, said radially extending portion being disposed contiguous to said rotor member and providing a conductor path therethrough which connects said slip ring means and said coil means.

9. An eddy current coupling as defined in claim 8 wherein said second support member includes an axially extending portion and a radially extending portion, said brush means being supported on said axially extending portion and having an axially extending surface which engages with said axially extending surface on said slip ring means.

10. An eddy current coupling as defined in claim 9 further including first seal means disposed between said axially extending portion of said first support member and said radially extending portion of said second support member and second seal means disposed between said axially extending portion of said second support member and said radially extending portion of said first support member, said first and second seal means operating to seal said sealed chamber defined by said first and second support members.

11. An eddy current coupling as defined in claim 8 wherein said impeller means includes a plurality of fan blades integrally formed on said radially extending portion of said first support member and rotatable therewith for impelling debris from said chamber into said passageway means.

12. An eddy current coupling as defined in claim 11 wherein said fan blades pass at least in part into said passageway means to impel debris therethrough.

13. An eddy current coupling as defined in claim 10 further including a tachometer assembly disposed within said sealed chamber, said tachometer assembly including a plurality of pole members disposed on said axially extending portion of of said first support member for rotation therewith and a stator assembly disposed on said axially extending portion of of said second support member.

14. A dynamoelectric machine comprising a housing having a longitudinal axis, a first mechanism disposed in said housing, a second mechanism disposed in said housing and rotatable relative to said first mechanism, rotating coil means located in said housing for electromagnetically coupling said first and second mechanisms and a slip ring assembly for supplying energy to said coil means, said slip ring assembly including a first support member connected to said second mechanism for rotation therewith, slip ring means for energizing said coil means supported by said first support member for rotation therewith, a second support member supported by said housing, brush means supported by said second support member in a position in said housing in which said brush means conductively engage with said slip ring means, said first and second support members defining a sealed chamber in which said slip ring means and brush means are located, passageway means from said sealed chamber for directing wear debris generated by the contact between said brush means and slip ring means from said sealed chamber and impeller means for impelling the debris to said passageway means and from said chamber.

15. A dynamoelectric machine as defined in claim 14, wherein said impeller means includes a plurality of fan blades integrally formed with said first support member and rotatable therewith for impelling debris from said chamber into said passageway means.

16. A dynamoelectric machine as defined in claim 15, wherein said fan blades passed at least in part into said passageway means to impel debris therethrough.

17. A dynamoelectric machine as defined in claim 16, wherein said passageway means includes an inlet passageway communicating with said sealed chamber at one end thereof for directing air through said passageway means but not into said sealed chamber and an outlet passageway connecting with said sealed chamber at one end thereof for directing debris out of said sealed chamber.

18. A dynamoelectric machine as defined in claim 17, wherein said sealed chamber includes an inner surface on the outer periphery thereof which is sloped in a radially outward direction and which communicates with said outlet passageway, said inner surface accumulating debris thereon which are directed in a radially outward direction along said sloped inner surface to said outlet passageway.

19. A dynamoelectric machine as defined in claim 14, wherein said sealed chamber includes an inner surface on the outer periphery thereof which is sloped in a radially outward direction and which communicates with said passageway means, said inner surface accumulating debris thereon which are directed in a radially outwardly direction along said sloped inner surface to said passageway means.

20. A dynamoelectric machine as defined in claim 18, wherein said second support member is stationary and said first support member rotates relative to said second support member and further including seal means disposed between said first and second support members for sealing said sealed chamber defined by said first and second support members.

* * * * *